No. 723,453. PATENTED MAR. 24, 1903.
F. J. FLETCHER.
APPARATUS FOR AERATING OR CARBONATING LIQUIDS.
APPLICATION FILED AUG. 25, 1902.
NO MODEL.
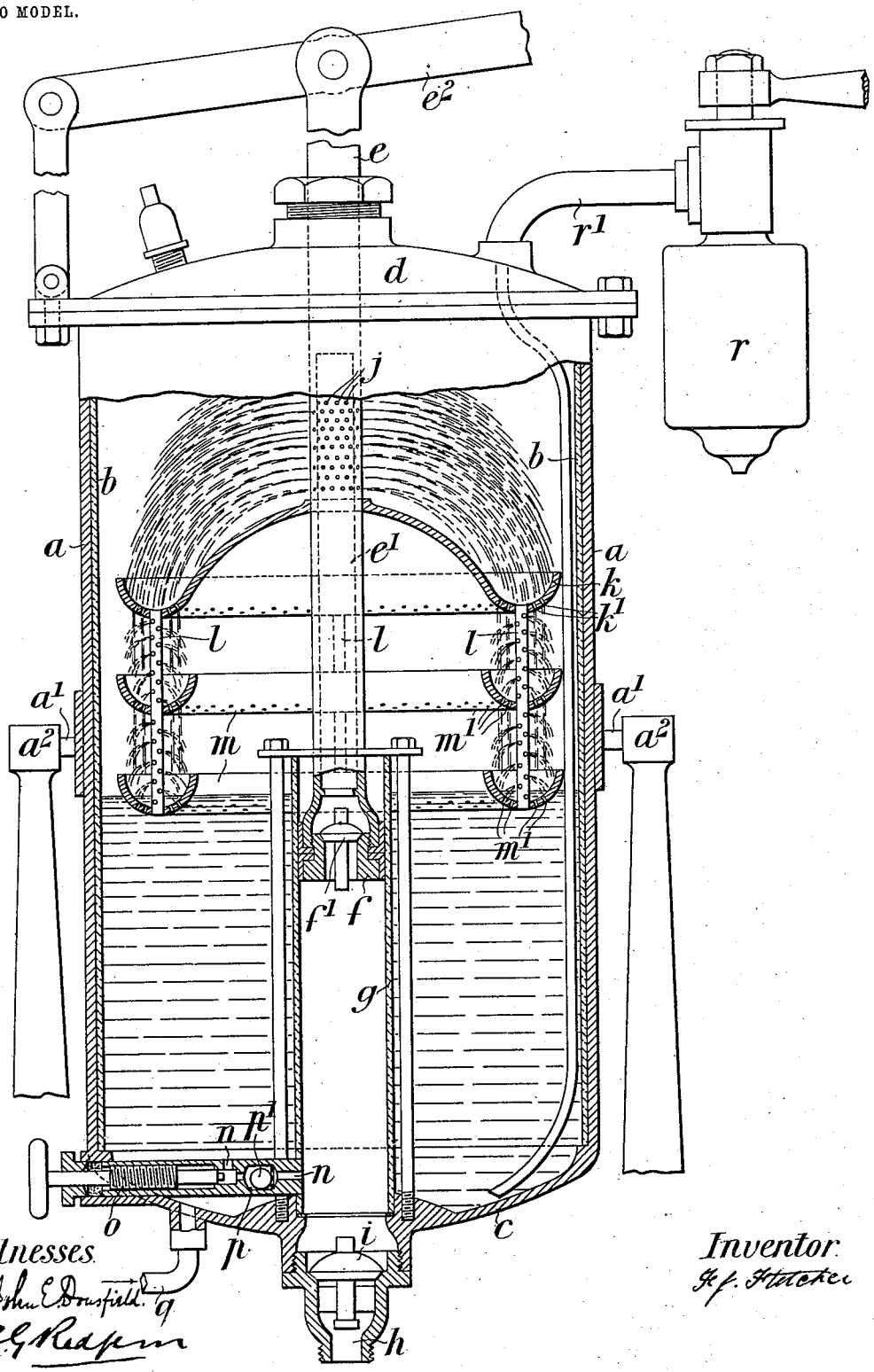
Witnesses
John E. Dronsfield
C. G. Reapen
Inventor
F. J. Fletcher

UNITED STATES PATENT OFFICE.

FRANCIS JAMES FLETCHER, OF LONDON, ENGLAND.

APPARATUS FOR AERATING OR CARBONATING LIQUIDS.

SPECIFICATION forming part of Letters Patent No. 723,453, dated March 24, 1903.

Application filed August 25, 1902. Serial No. 120,988. (No model.)

*To all whom it may concern:*

Be it known that I, FRANCIS JAMES FLETCHER, a subject of the King of Great Britain, residing at 11 Filey avenue, Upper Clapton, London, England, have invented new and useful Improvements in Apparatus for Aerating or Carbonating Liquids, of which the following is a specification.

This invention relates to improvements in apparatus for aerating or carbonating beers, mineral waters, and other liquids.

According to the invention my improved apparatus comprises a vessel of suitable material, such as copper or brass, the said vessel being mounted upon trunnions carried in suitable bearings and being of a form to withstand a high internal pressure. In practice the said vessel is preferably cylindrical in shape, lined with glass, and provided with a dome-shaped bottom and a similarly-shaped cover, through which passes a hollow piston-rod adapted to be reciprocated by suitable means and carrying at its inner end a piston working in a cylinder secured to the bottom of the vessel. The lower end of the cylinder is in connection with the supply of water or other liquid to be aerated, and the carbonic-acid gas is conveyed from the usual reservoir into the bottom of the vessel.

In operation, the piston-rod being reciprocated, the water or other liquid is drawn into the cylinder through a non-return valve provided in the piston and into the hollow rod, whence it escapes through lateral perforations onto an annular tray or flange, which is perforated at its bottom, so as to allow the liquid discharged into it to escape downward. This tray is attached to the reciprocating piston-rod and has depending from it a number of hollow perforated rods, to which is attached a number—say two—of annular trays perforated at the bottom, as in the case of the first-mentioned tray, so that the liquid projected into the uppermost tray escapes through the perforations therein and also down the connecting-tubes and through the perforations therein into the next tray, and so on, whereby it is very finely divided and comes into very intimate contact with the carbonic-acid gas introduced into the vessel, as above mentioned.

To further perfect the aeration of the liquid, I provide a passage between the lower end of the cylinder and the bottom of the vessel, this passage being normally closed by a screw-valve and being also provided with a ball-valve. With this arrangement when the necessary quantity of liquid has been introduced into the vessel in the manner above described the aforesaid passage is opened, so that when the pump-piston is further reciprocated the liquid contained in the vessel is caused to circulate through the same, so as to complete the aeration or carbonation.

The aerated liquid is drawn off from the vessel by any known form of draft-arm, the said draft-arm, however, being attached to the cover of the vessel, thus reducing the cost of the apparatus, as it dispenses with the cabinet or counter to which the draft-arm is usually secured, or the aerated liquid can be conveyed through a discharge-pipe to a bottling-machine.

In the accompanying drawing I have illustrated in sectional elevation apparatus made according to the invention.

$a$ is the cylindrical vessel, of brass, copper, or other suitable material, the said vessel being mounted upon trunnions $a'\ a'$, carried in supports $a^2\ a^2$.

$b$ is the internal lining of glass.

$c$ is the dome-shaped bottom, and $d$ is the similarly-shaped cover, the latter being shown bolted to the vessel $a$.

$e$ is the piston-rod, the lower part of which is made hollow, as shown at $e'$, and $f$ is the piston provided upon the inner end of the said rod $e$, the said piston being furnished with a non-return valve $f'$.

$g$ is the cylinder, in which the piston $f$ is reciprocated through the medium of the lever $e^2$ and which is rigidly secured to the bottom $c$ of the vessel $a$. This cylinder is made of glass or another suitable material, such as brass, and the liquid to be aerated has access to its lower end through the inlet $h$, controlled by the non-return valve $i$.

$j\ j$ are the lateral perforations which are provided in the hollow portion $e'$ of the piston-rod $e$, and $k$ is the annular tray which is secured to the piston-rod immediately below the said perforations, the said tray being provided with perforations $k'\ k'$ at its bottom part.

$l\ l$ are the hollow perforated rods which depend from the underside of the annular tray $k$ and upon which are mounted the two annular trays $m$ $m$, which are also provided with perforations $m'$ $m'$ at the bottom similarly to the tray $k$.

$n$ is the passage which connects the lower end of the cylinder $g$ with the bottom of the vessel $a$, the said passage being normally closed by the screw-valve $o$ and being provided with an enlargement $p$, which contains a ball-valve $p'$ for controlling the circulation of the liquid, as hereinafter described.

$q$ is the inlet for the carbonic-acid gas, and $r$ is the draft-arm for withdrawing the aerated liquid, the said draft-arm being carried by a bracket $r'$, secured to the cover $d$ of the apparatus. In lieu of the draft-arm the liquid can be withdrawn into a bottling or siphon filling apparatus.

It will be understood that the piston-rod $e$ instead of being reciprocated by means of the hand-lever $e^2$ can be operated by other suitable means, if desired.

The operation of the apparatus is as follows: The water or other liquid being admitted through the inlet $h$ and the carbonic-acid-gas inlet $q$ being open and the valve $o$ closed, the piston $f$ is reciprocated by means of the lever $e^2$, so as to force water into the hollow portion $e'$ of the rod $e$ and to cause it to be projected in the manner shown through the lateral perforations $j$ $j$ onto the topmost tray $k$ and thence through the perforations $k'$ and the hollow perforated rods $l$ into the next tray, and so on, the said liquid in its finely-divided or pulverized condition coming into intimate contact with the carbonic-acid gas which has been admitted through the inlet $q$, and so being aerated. When the required quantity of liquid has been introduced into the vessel, the passage $n$ is opened by screwing the screw-valve $o$ into the position shown in the drawing, whereupon the further reciprocation of the pump-rod $e$ causes the liquid to circulate through the vessel, thus thoroughly completing the blending and aeration. The passage $n$ also enables the delivery of the pump to be regulated to suit the capacities of the vessels being filled, as by partially opening the passage the liquid drawn into the pump-cylinder at each suction-stroke is supplied partially from the vessel $a$ and partially from the supply.

Having now particularly described and ascertained the nature of my said invention and in what manner the same is to be performed, I declare that what I claim is—

1. In apparatus for aerating or carbonating liquids, the combination with a closed vessel, of a cylinder secured inside of said vessel adjacent to the lower part thereof, a perforated piston in said cylinder, a hollow piston-rod communicating with the aperture in the piston extending outside of the vessel, said piston-rod being provided within the vessel with perforations above the cylinder, means for supplying liquid to said cylinder and air-inlet for admitting air or gas to said vessel, substantially as described.

2. In apparatus for aerating or carbonating liquids, the combination with a closed vessel, of a cylinder secured inside of said vessel adjacent to the lower part thereof, a perforated piston in said cylinder, a hollow piston-rod communicating with the aperture in the piston extending outside of the vessel, said piston-rod being provided within the vessel with perforations above the cylinder, an annular perforated tray secured to said piston-rod below said perforations, means for supplying liquid to the cylinder and an inlet for admitting air or gas to said vessel, substantially as described.

3. In apparatus for aerating or carbonating liquids, the combination with a closed vessel, of a cylinder secured inside of said vessel adjacent to the lower part thereof, a perforated piston in said cylinder, a hollow piston-rod communicating with the aperture in the piston extending outside of the vessel, said piston-rod being provided within the vessel with perforations above the cylinder, a plurality of superimposed annular perforated trays secured to said hollow piston-rod below said perforations, said trays being connected by vertically-disposed perforated tubes, means for supplying liquid to said cylinder, and an inlet for admitting air or gas to said vessel, substantially as described.

4. In apparatus for aerating or carbonating liquids, the combination with a closed vessel, of a cylinder secured inside of said vessel adjacent to the lower part thereof, a perforated piston in said cylinder, a hollow piston-rod communicating with the aperture in the piston extending outside of the vessel, said piston-rod being provided within the vessel with perforations above the cylinder, means for supplying liquid to said cylinder from outside of said vessel, a by-pass connecting said cylinder with the interior of the vessel, a valve for controlling said by-pass, operating means for said valve extending outside of said vessel, and an inlet for admitting air or gas to said vessel, substantially as described.

5. In apparatus for aerating or carbonating liquids, the combination with a closed vessel, of a cylinder secured inside of said vessel adjacent to the lower part thereof, a perforated piston in said cylinder, a hollow piston-rod communicating with the aperture in the piston extending outside of the vessel, said piston-rod being provided within the vessel with perforations above the cylinder, means for supplying liquid to said cylinder, an inlet for admitting air or gas to said vessel, and a draft-arm for withdrawing the aerated liquid, directly mounted on said vessel, substantially as described.

FRANCIS JAMES FLETCHER.

Witnesses:
 JOHN E. BOUSFIELD,
 C. G. REDFERN.